Patented Aug. 18, 1936

2,051,460

UNITED STATES PATENT OFFICE 2,051,460

METHOD FOR RAISING PLANTS FROM SEED

Gerhard von Skrbensky, Zeuthen, Germany, assignor to Sprout Limited, London, England, a British company No Drawing. Application May 27, 1935, Serial No. 23,793. In Great Britain May 30, 1934

15 Claims. (Cl. 47—58)

This invention is for improvements in or relating to a method for raising plants from seed and deals with the raising of plants from seed with or without the presence of soil.

It is an object of the present invention to provide a method for raising plants having a feeding value from seeds with or without soil which method produces plants of greater nutritive value and containing greater amounts of accessory food factors and of substances increasing resistance to disease in the consumer than such plants have hitherto contained. Thus, plants raised by the present process, particularly when raised in the absence of soil, may be employed as one of the constituents of a balanced ration for farm animals.

Among the plants to which the present method may be applied with advantage may be mentioned cereals such as maize, wheat, oats and barley, papilionaceous plants such as peas and beans, tubers such as potatoes, and plants such as tobacco which are normally difficult to raise in temperate zones. For many years agricultural chemists have investigated with varying degrees of success methods of raising plants from seed without soil. Broadly speaking, such methods have involved the spraying or irrigation of the seeds with liquid feeding media containing in solution such agents as are necessary for germination and growth.

Research has now disclosed the fact that successful germination and growth are dependent, to a very large degree, on the composition of the liquid media employed and furthermore that if the plants raised by such methods are used as fodder for animals, the value of the fodder both for nourishment and for the prevention of disease is dependent on the employment of even very small quantities of agents which impart to the fodder itself the power of stimulating in the animal certain hormones, glands or like organs, the function of which it is important to maintain in a state of activity.

It has been ascertained, for example, that certain diseases in animals, such as cancer, may arise from the nature of their foodstuffs and it is particularly desirable to produce foodstuffs which give to animals a natural resistance against such diseases.

Further, it is believed that the particular substances which confer resistance to disease e. g. to goitre and cancer, may be transmitted to the consumers of the flesh or milk of animals fed on fodder raised in accordance with the present invention.

The present invention includes a process for raising plants from seeds with or without soil by treatment of the seeds with an aqueous liquid having nutrient materials dissolved or suspended therein and wherein such nutrient material includes a proportion of a salt of sulphocyanic acid. The salt of sulphocyanic acid may comprise an alkali salt for example the sodium or potassium salt. In one preferred form of the invention the salt may be ammonium sulphocyanate.

The proportions of such salt required are usually very small. Thus, the amount of ammonium sulphocyanate may be of the order of 0.1% on the weight of the solid content of the feeding liquid.

In one method of carrying the invention into effect the seeds are first treated with water for example for a period of 12 to 24 hours and the water is then replaced by the liquid feeding medium. Both the preliminary treatment with water and the actual germination and growth of the seeds are carried out preferably at a temperature of the order of 18 to 24° C. The seeds are preferably arranged in perforated trays in a layer one to three seeds thick and the feeding liquid is preferably fed to the rootlets of the plants either in a continuous stream or intermittently. When the feeding liquid is changed at intervals it is desirable that the change should take place at least once in 24 hours. The seeds are preferably maintained undisturbed throughout the period of their growth and as the seeds sprout the level of the feeding medium is reduced so that only the ends of the rootlets are immersed therein.

It has been found that the feeding liquid may with advantage contain a proportion of iodine salts and in one preferred case the proportion of iodine salts is of the order of 0.3% on the weight of the solid content of the feeding medium.

The present invention may with advantage be applied to the rapid raising of plants in the presence of soil, the germination and early stages of growth being carried out in the presence of water and an aqueous feeding medium. This modification of the process is of importance when it is desired to raise plants to a state of maturity requiring the development of root and stem which would only be attained when the plant is in soil. In this form of the invention the seeds are treated with water and/or a feeding liquid until germination has taken place and the first leaves have appeared and the plant is then transplanted to soil. Alternatively, the seeds may be planted from the first in soil and subjected to spraying or irrigation with a feeding liquid until the first leaves have appeared when they may be transplanted and the feeding discontinued. This form of the invention may be applied with particular advantage to the growing of tobacco, of root crops such as potatoes and of hops. In the case of tobacco, seeds may be planted in soil maintained with a moisture content of approximately 50% and at a temperature of about 30° C. while treated with a feeding liquid and exposed to sunlight and/or to irradiation with ultra-violet rays. When the first leaves appear the plants are transplanted to the site in which they are to be raised to maturity.

Potatoes may be raised to a certain state of maturity by growing them in soil in the dark and treating them with a feeding liquid but in order to bring them to full maturity they are raised at a temperature about 20° C. in soil in the presence of sunlight and/or ultra-violet radiation, the soil being kept moist with the feeding liquid and the plants transplanted when the first leaves appear.

In a further form of the invention the growing seeds are exposed to sunlight or ultra-violet radiation continuously and in order that sunlight may be utilized to full effect the chamber in which the plants are raised is provided with glass permeable to ultra-violet radiation.

The feeding liquid is preferably applied to the soil from above and below i. e. by a combined irrigation and spraying process in order to ensure a uniform moisture content throughout.

The seeds are conveniently planted in the soil to a depth equal to twice the thickness of the seed and if desired the feeding may commence with water or a dilute solution of the nutrient material, the concentration being increased as the seed germinates.

It will be understood that it is within the scope of the invention to raise plants to maturity from seed planted in soil without transplanting and maintained at an elevated temperature while being fed with a feeding liquid by admitting light and/or irradiating the plant with ultra-violet rays. Further, the seeds planted in soil and fed with a feeding liquid may have been previously germinated by feeding with a similar liquid in the absence of soil.

The necessary precautions should, of course, be taken when transplanting plants raised at elevated temperatures to sites out of doors.

Following are descriptions by way of example of methods of carrying the present invention into effect:

Example I

This example describes a typical feeding madium for use in raising seeds with or without soil. A mixture of 10 kg. of potassium nitrate, 5 kg. of Norwegian saltpetre, 2 kg. of sodium phosphate and 1 kg. of magnesium sulphate is ground together with 25 grms. of ammonium thiocyanate and relatively small amounts of iron and calcium compounds and soluble iodides and iodates and dissolved in tap water to make a concentrated solution and is employed in diluted form for the feeding of plants either with or without soil. The solution may contain in addition proportions of urea and sugars such as cane sugar, dextrose and lactose.

The composition of the liquid feeding medium may vary somewhat with the particular plants which are to be grown.

Example II

This example sets out one method of growing maize from seed without soil. The maize is spread in a layer about 1 or 2 grains thick on a perforated metal tray or similar supporting surface and is immersed in running tap water for 18 to 24 hours. At the end of that time the water is replaced by an aqueous feeding medium of the type set out in Example I and having the composition:—

| | Grms. |
|---|---|
| Potassium nitrate | 100 |
| Normal sodium phosphate | 10 |
| Magnesium sulphate | 5 |
| Urea | 20 |
| Ferric citrate | 0.2 |
| Calcium sulphate | 1 |
| A mixture in equal proportions of lactose, glucose and saccharose | 3 |

Traces of ammonium sulphocyanide and of iodine salts.

The seeds are treated with the above medium by running the liquid through the supporting trays. The level of the liquid is reduced as the roots grow and is kept just above the ends of the rootlets. The temperature is maintained throughout at between 18° and 24° C. At the end of 10 days or so the maize plants reach full growth (about 30 cms. in height depending on the conditions) and may be used as fodder with the addition of roughage such as hay or straw. The plants thus produced are rich in accessory food factors and therapeutic priciples having prophylactic properties and these desirable characteristics are transmitted in the case of animals such as cows to their milk.

Sudden changes in the concentration of the aqueous feeding medium must be avoided in order that the rapid and continuous growth of the plant may not be interrupted.

Example III

This example illustrates the growth of seeds with the aid of soil. Tobacco seeds are sown to a depth about twice the thickness of the seed in a light soil rich in humus. The soil is in a layer about 20 cms. thick and is contained in a perforated tray standing within another tray to which feeding liquid may be supplied. Means are also provided for spraying feeding liquid on the surface of the soil, the total amount of liquid supplied being sufficient to maintain the moisture content of the soil at about 50%. The trays are surrounded by glass walls permeable to short wave radiation e. g. blue glass and the apparatus is exposed to sunlight by day and to the radiation from a mercury vapour lamp by night and when there is no sunshine. The temperature of the enclosure is maintained at about 30° C.

The feeding liquid consists of 1 grm. of the following mixture dissolved in 5 litres of water:—

| | Grms. |
|---|---|
| Potassium nitrate | 103 |
| Normal sodium phosphate | 10 |
| Magnesium sulphate | 5 |
| Urea | 5 |
| Ferric citrate | 0.2 |
| Calcium sulphate | 1 |
| Glucose, lactose and saccharose in equal proportions | 3 |
| Ammonium sulphocyanide | 0.2 |

(The ammonium sulphocyanide may, if desired, be replaced by any other soluble sulphocyanide).

The concentration of the liquid may later be increased to 2 to 3 grms. of mixed solid per 5 litres of water. In two to three weeks, when the rootlets are well developed and the first green leaves appear the plants may be transplanted. Alternatively, if the enclosure is of sufficient size the tobacco plants may be grown therein to maturity i. e. to the harvesting stage without transplanting.

*Example IV*

Seed potatoes are planted in a layer of soil about 30 cms. deep in an apparatus similar to that described in Example III and are maintained at about 20° C. The feeding liquid is substantially the same as that employed in Example III.

When new potatoes only are required treatment with sunlight or artificially produced ultraviolet radiation may be reduced in amount or omitted altogether.

I claim:

1. A process for raising from seeds plants for use as a biologically valuable foodstuff which comprises treating the seeds maintained at an elevated temperature of the order of 18–30° C. with an aqueous liquid having nutrient materials dissolved or suspended therein and wherein such nutrient material includes a proportion of alkali thiocyanates and iodine salts.

2. A process for raising from seeds plants for use as a biologically valuable foodstuff which comprises treating the seeds maintained at an elevated temperature of the order of 18–30° C. and while planted in earth with an aqueous liquid having nutrient materials dissolved or suspended therein and wherein such nutrient material includes a proportion of alkali thiocyanates and iodine salts.

3. A process for raising from seeds plants for use as a biologically valuable foodstuff which comprises treating the seeds maintained at an elevated temperature of the order of 18–30° C. with an aqueous liquid having nutrient materials dissolved or suspended therein and wherein such nutrient material includes a proportion of ammonium salt of sulpho-cyanic acid and iodine salts.

4. A process for raising from seeds plants for use as a biologically valuable foodstuff which comprises treating the seeds maintained at an elevated temperature of the order of 18–30° C. with an aqueous liquid having nutrient materials dissolved or suspended therein and wherein such nutrient material includes alkali thiocyanate in amount of the order of 0.1% on the weight of the solid content of the feeding liquid and iodine salts in amount of the order of 0.3% on the weight of the solid content of the feeding liquid.

5. A process for raising from seeds plants for use as a biologically valuable foodstuff which comprises treating the seeds maintained at an elevated temperature of the order of 18–30° C. with an aqueous liquid having nutrient materials dissolved or suspended therein and wherein such nutrient material includes ammonium thiocyanate in amount of the order of 0.1% on the weight of the solid content of the feeding liquid and iodine salts in amount of the order of 0.3% on the weight of the solid content of the feeding liquid.

6. A process for raising from seeds plants for use as a biologically valuable foodstuff which comprises treating the seeds maintained at an elevated temperature of the order of 18–30° C. with water for a period of 12 to 24 hours, withdrawing the water and replacing it by an aqueous liquid having nutrient materials dissolved or suspended therein and wherein such nutrient material includes a proportion of alkali thiocyanate in amount of the order of 0.1% on the weight of the solid content of the feeding liquid and iodine salts in amount of the order of 0.3% on the weight of the solid content of the feeding liquid.

7. A process for raising from seeds plants for use as a biologically valuable foodstuff which comprises treating the seeds maintained at an elevated temperature of the order of 18–30° C. in the presence of water for a period of 12 to 24 hours, withdrawing the water at the end of that time and replacing it with an aqueous liquid having nutrient materials dissolved or suspended therein, the said materials including a proportion of an alkali thiocyanate and iodine salt and changing the said feeding liquid at least once every 24 hours.

8. A process for raising from seeds plants for use as a biologically valuable foodstuff which comprises treating the seeds maintained at an elevated temperature of the order of 18–30° C. with an aqueous liquid having nutrient materials dissolved or suspended therein including a proportion of an alkali thiocyanate and an iodine salt and transplanting the seeds to soil as soon as the first leaves appear.

9. A process for raising from seeds plants for use as a biologically valuable foodstuff which comprises treating the seeds while planted in soil and maintained at an elevated temperature of the order of 18–30° C. with an aqueous liquid having nutrient materials dissolved or suspended therein, said nutrient material including a proportion of an alkali thiocyanate and iodine salt, the amount of aqueous liquid being such as to constitute about 50% of the total weight of the soil.

10. A process for raising from seeds plants for use as a biologically valuable foodstuff which comprises treating the seeds maintained at an elevated temperature of the order of 18–30° C. with an aqueous liquid having nutrient materials dissolved or suspended therein said materials including a proportion of an alkali thiocyanate and iodine salt, the liquid feeding medium being maintained at such a level that it covers only the ends of the roots of the plants.

11. A process for raising from seeds plants for use as a biologically valuable foodstuff which comprises treating the seeds maintained at an elevated temperature of the order of 18–30° C. in the dark with an aqueous liquid having nutrient materials dissolved or suspended therein said nutrient materials including a proportion of an alkali thiocyanate and an iodine salt.

12. A process for raising from seeds plants for use as a biologically valuable foodstuff which comprises treating the seeds maintained at an elevated temperature of the order of 18–30° C. with an aqueous liquid having nutrient materials dissolved or suspended therein, said nutrient materials including a proportion of alkali thiocyanate and iodine salts, the seeds being subjected to the influence of radiations during growth.

13. A process for raising from seeds plants for use as a biologically valuable foodstuff which comprises treating the seeds maintained at an elevated temperature of the order of 18–30° C. with an aqueous liquid having nutrient materials dissolved or suspended therein, such nutrient materials including a proportion of an alkali thiocyanate and iodine salts and the aqueous liquid containing between 1 and 3 grams of solid per 5 litres of water.

14. A process for raising from seeds plants for use as a biologically valuable foodstuff which comprises treating the seeds maintained at an elevated temperature of the order of 18–30° C. with an aqueous liquid having nutrient materials dissolved or suspended therein the said nutrient materials including a proportion of an alkali thiocyanate and iodine salts and replacing the aqueous liquid from time to time by fresh liquid, the concentration of the nutrient material being gradually increased.

15. A process for raising from seeds plants for use as a biologically valuable foodstuff which comprises treating the seeds maintained at an elevated temperature of the order of 18–30° C. with an aqueous liquid having nutrient materials dissolved or suspended therein said nutrient materials including in addition to a proportion of alkali thiocyanate and iodine salts, salts of iron and calcium.

GERHARD von SKRBENSKY.